United States Patent [19]

Sarugaku et al.

[11] Patent Number: 5,227,866
[45] Date of Patent: Jul. 13, 1993

[54] TELEVISION RECEIVER FOR EXTENDED DEFINITION VIDEO SIGNAL DETECTS NUMBER OF SCAN LINES AND CONTROLS SIGNAL PROCESSORS

[75] Inventors: Toshio Sarugaku, Chiba; Hiroyuki Kawashima, Tokyo; Hiroyuki Kita; Masaharu Tokuhara, both of Kanagawa, all of Japan

[73] Assignee: Sony Corporation, Tokyo, Japan

[21] Appl. No.: 845,710

[22] Filed: Mar. 4, 1992

[30] Foreign Application Priority Data

Mar. 4, 1991 [JP] Japan .................................. 3-061107

[51] Int. Cl.⁵ ............................................ H04N 11/02
[52] U.S. Cl. ...................................... 358/11; 358/140
[58] Field of Search ................. 358/140, 11, 160, 105

[56] References Cited

U.S. PATENT DOCUMENTS

| | | |
|---|---|---|
| 4,739,390 | 4/1988 | Achiha et al. .................. 358/31 X |
| 4,760,455 | 7/1988 | Nagashima ..................... 358/140 X |
| 4,853,765 | 8/1989 | Katsumata et al. ............. 358/140 X |
| 4,860,090 | 8/1989 | Murata et al. .................. 358/11 X |
| 5,041,904 | 8/1991 | Higuchi et al. .................. 358/11 |

Primary Examiner—Victor R. Kostak
Attorney, Agent, or Firm—Lewis H. Eslinger; Jay H. Maioli

[57] ABSTRACT

A television receiver for extended definition television carries out scanning line interpolation in a way that eliminates picture shift on the screen and ensures normal display when supplied with a non-standard video signal having a scanning line count of other than 262.5 lines per field. The television receiver includes a scanning line interpolation circuit, a normal video signal detection circuit and a interpolation controller. The scanning line interpolation circuit effects scanning line interpolation using either data in the current field or out-of-field data as per the result of motion detection in the picture. The normal video signal detection circuit distinguishes the normal video signal from other signals by detecting the number of scanning lines involved. The interpolation controller causes the scanning line interpolation circuit to effect scanning line interpolation using only the inside-field data if the supplied signal is a non-standard signal.

6 Claims, 11 Drawing Sheets

TELEVISION RECEIVER FOR EXTENDED DEFINITION VIDEO SIGNAL DETECTS NUMBER OF SCAN LINES AND CONTROLS SIGNAL PROCESSORS

BACKGROUND OF THE INVENTION

1. Field of the Invention

The present invention relates to a television receiver comprising a signal processing system that separates a composite video signal into a luminance signal and a chrominance signal and performs high picture quality processing such as scanning line interpolation on the two signals.

2. Description of the Prior Art

The improved television receiver known as EDTV (extended definition television) generally works as follows. The receiver first separates a composite video signal into a luminance signal and a chrominance signal, converts the two signals to digital format, submits the digitized signals to scanning line interpolation for doubling the number of the scanning lines involved, and subjects the resulting signals to half-time compression. After their conversion to digital format followed by the scanning line interpolation and time compression, the luminance signal and the chrominance signal are converted back to analog format and are supplied to a matrix circuit. The matrix circuit generates a red, a green and a blue signal whose rate is double the normal rate. The double rate red, green and blue signals, with their scanning line counts being twice as many as normal, provide non-interlaced scanning for high picture quality.

The scanning line interpolation method under the above scheme involves the use of a circuit that determines whether a supplied video signal is a motion picture signal or a still picture signal. If the supplied video signal is found to be a motion picture signal, an interpolation signal is generated using data in a field. If the detected signal is a still picture signal or something intermediate between motion and still picture, an interpolation signal is generated using data in other fields such as the one preceding the current field or subsequent thereto (the data is called out-of-field data).

Figure 11:
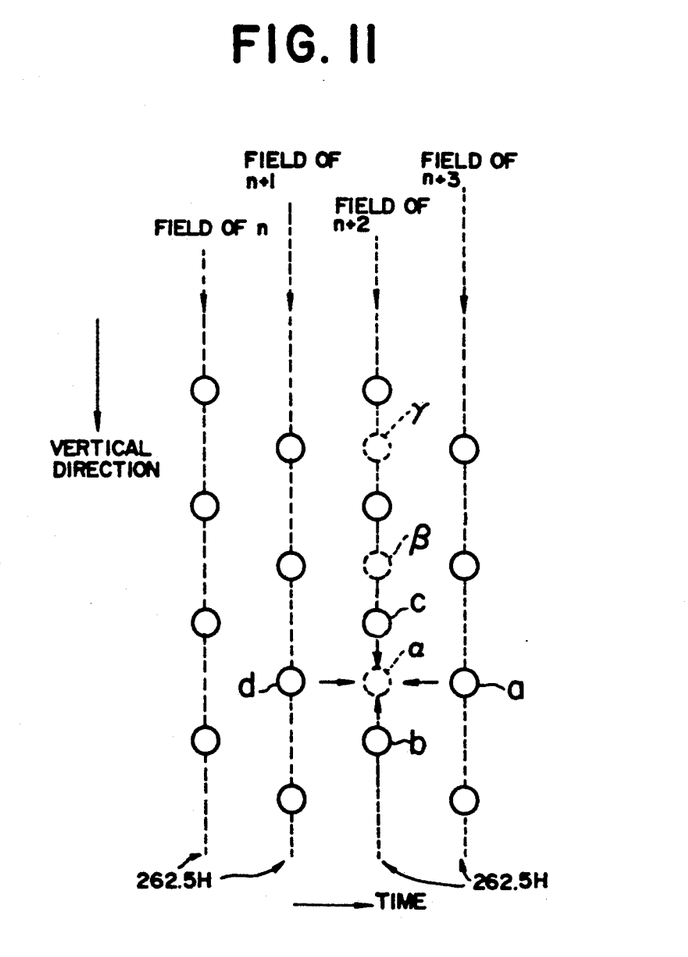
FIG. 11 is a view showing how scanning line interpolation is carried out.

How the above-described scanning line interpolation method basically works is described with reference to the model in FIG. 11. In the model of FIG. 11, the ordinate axis represents the vertical direction. Some of the 262.5 scanning lines are shown using circular cross sections thereof. The abscissa represents time base, on which the n-th field through the (n+3)th field of a video signal are indicated.

As evident from FIG. 11, the interlaced scanning as per the NTSC system is realized because the scanning line positions are shifted in the vertical direction between odd-numbered and even-numbered fields of a video signal. The scanning line interpolation described above involves interpolating the scanning lines in each field. For example, broken line circles ($\alpha$, $\beta$, $\gamma$, etc.) are interpolated in the (n+2)th field. (In FIG. 11, the interpolated scanning lines in the other fields are not shown.)

Consider the interpolation of scanning lines for a signal $\alpha$. First, the signal a in the (n+3)th field is compared with the signal d in the (n+1)th field, the latter field being delayed by 525H (i.e., by one frame). A check is made at this point to see if the picture involves motion. If the picture is found to be moving, it is not appropriate to generate the signal $\alpha$ by mixing the signals a and d of other fields. Instead, the signal $\alpha$ is generated by mixing the signals b and c which represent the scanning lines above and below the signal $\alpha$. That is, the interpolation in this case is carried out using only the data in the (n+2)th field.

If the comparison of the signal a with the signal d shows the picture to be still, the signal $\alpha$ is generated by mixing the signal a in the (n+3)th field with the signal d in the (n+1)th field, each of the latter two signals being shifted by a time period of 262H in the direction of the signal $\alpha$. That is, the interpolation in this case is performed using the data in fields other than the (n+2)th field.

The number of scanning lines per field is usually 262.5. With signals of this standard scanning line count, there is no problem as long as they are interpolated using inside-field data when found to be motion picture signals, or using out-of-field data when found to be still picture signals. In some cases, however, there may be supplied video signals whose number of scanning lines per field is not 262.5 (262 to 263).

Figure 12A:
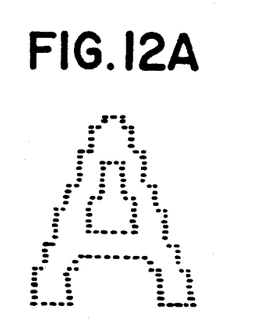
FIGS. 12A and 12B are views illustrating how a non-standard video signal turns into a dislodged image when displayed on the screen.
Figure 12B:
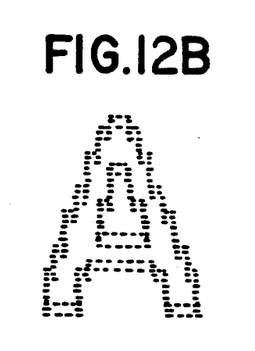

One such case involves a video disc player that is brought to a stop while supplying a video signal. The stopped state causes the video disc player to supply non-standard signals, their scanning line count per field alternating between 261.5 and 263.5. In the stopped state, a blue screen typically appears on the display with no image contained therein. However, if characters are displayed, they dislodge vertically. For example, a character "A" in FIG. 12 (A) appears dislocated as shown in FIG. 12 (B).

Figure 13:
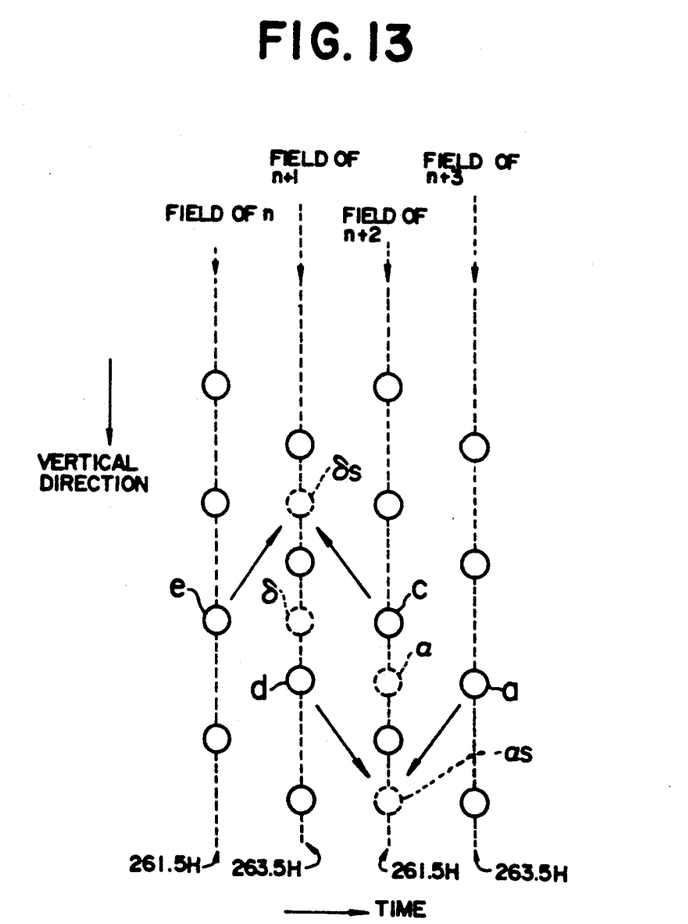
FIG. 13 is a view depicting how scanning line interpolation is performed on a non-standard video signal.

The reasons for this phenomenon are explained with reference to FIG. 13. Where the signal $\alpha$ is to be interpolated, the signal a is first compared for motion detection with the signal d which is delayed by 525H. (The signal d applies here since $261.5+263.5=525$.) In this case, the signal is found to be a still picture signal. Thus the signal $\alpha$ is generated by shifting the signals a and d by 262H in the direction of the signal $\alpha$ and by mixing these two signals. However, if the number of scanning lines per field alternates between 261.5 and 263.5, the position of the signals a and d after the temporal shift of 262H actually corresponds to the position of a signal $\alpha$ s. Likewise, the interpolation using signals c and e results not in a signal $\gamma$ but in a signal $\gamma$ s. It is for these reasons that the picture dislodges vertically when a non-standard signal is supplied.

SUMMARY OF THE INVENTION

It is therefore an object of the present invention to overcome the above and other deficiencies and disadvantages of the prior art, and to improve the prior art.

In carrying out the invention and according to one aspect thereof, there is provided a television receiver for extended definition television comprising a luminance video signal processing circuit, a chrominance video signal processing circuit, and a normal video signal detection circuit.

In a preferred structure according to the invention, the luminance video signal processing circuit comprises: a field memory for delaying a video signal; a motion detection circuit connected to the field memory; a scanning line interpolation circuit connected to the field memory; and a time compression circuit connected to the scanning line interpolation circuit.

In another preferred structure according to the invention, the chrominance video signal processing circuit comprises: a field memory for delaying a video signal; an adder connected to the field memory; and a time compression circuit.

In a further preferred structure according to the invention, the normal video signal detection circuit detects the number of scanning lines of each field of a video signal and generates a determination signal determining whether the video signal is a normal video signal or not.

In a yet further preferred structure according to the invention, the motion detection circuit comprises: a filter connected to the field memory; an absolute circuit connected to the filter; a coefficient generator connected to the absolute circuit; and a coefficient controller connected to the coefficient generator.

In another preferred structure according to the invention, the coefficient controller receiving a signal from the normal video signal detection circuit controls the scanning line interpolation circuit for interpolation using only data in the current field, when the normal video signal detection circuit generates a detection signal indicating the detection of a signal other than the normal video signal.

In a further preferred structure according to the invention, the field memory comprises a first memory, a second memory and a third memory, all connected in series.

If a non-standard signal is supplied while a still picture is being in effect, interpolation is performed using only inside-field data, i.e., the upper and the lower scanning lines of the current line. This protects the signal generated through the interpolation process from the influence of the varying scanning line count per field.

These and other objects, features and advantages of the invention will become more apparent upon a reading of the following description and appended drawings.

DESCRIPTION OF THE PREFERRED EMBODIMENT

Figure 1:
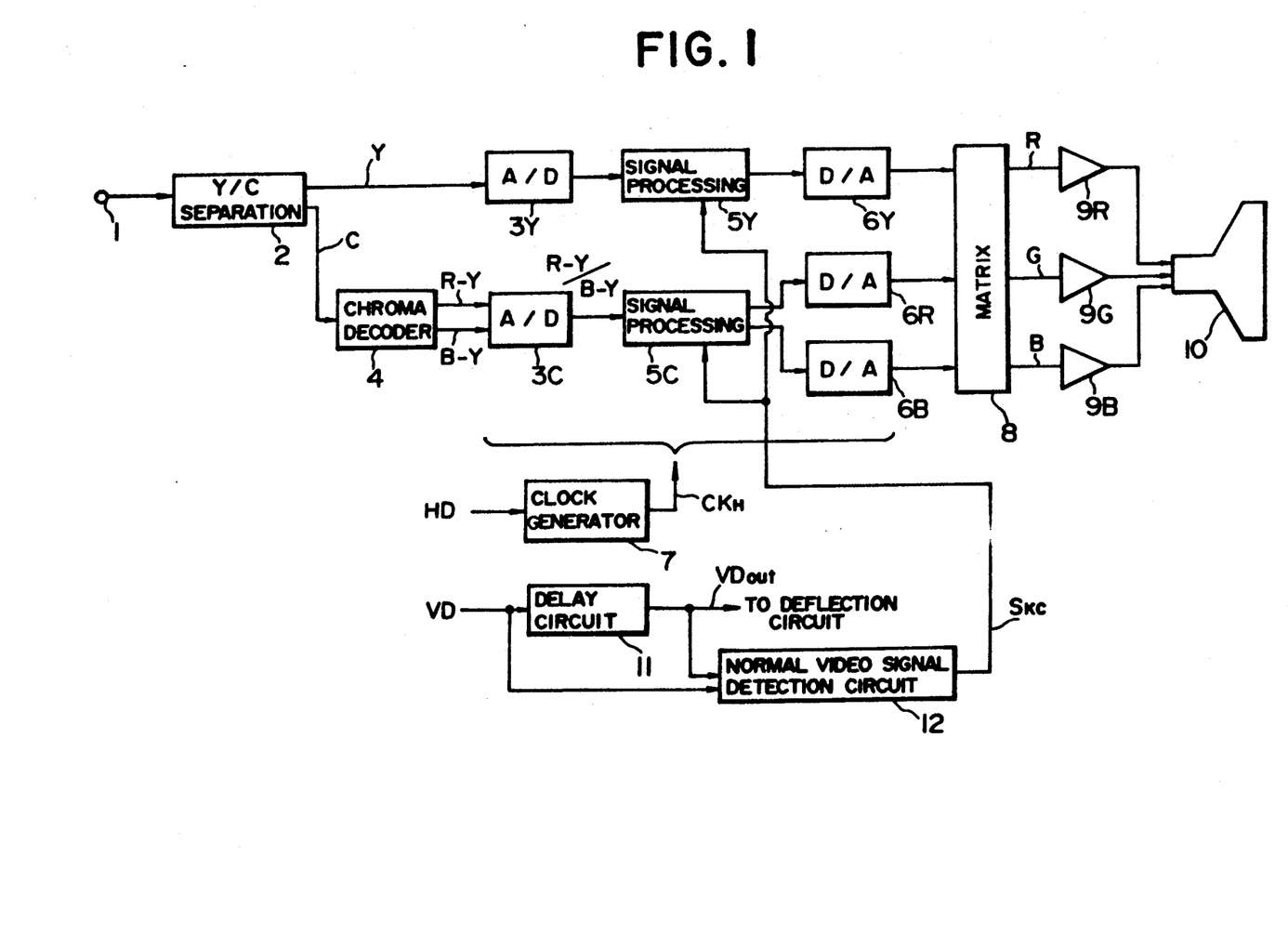
FIG. 1 is a block diagram of a video signal processing circuit section in a television receiver practiced as a preferred embodiment of the invention.

One preferred embodiment of the present invention will now be described with reference to FIGS. 1 through 6. FIG. 1 is a block diagram of a circuit for processing an input composite video signal in a television receiver practiced as the preferred embodiment of the invention.

A composite video signal entered through an input terminal 1 is fed to a Y/C separation circuit 2 illustratively comprising a comb line filter that operates on the line correlation principle. The Y/C separation circuit 2 separates the composite video signal into a luminance signal Y and a chrominance signal C. After leaving the Y/C separation circuit 2, the luminance signal Y is sent to an A/D converter 3Y wherein the signal is converted to digital format. The digitized signal is supplied to a signal processing circuit 5Y. The chrominance signal C from the Y/C separation circuit 2 is fed to a chroma decoder 4 for chrominance demodulation into a red color difference signal R-Y and a blue color difference signal B-Y. The signals R-Y and B-Y are converted to digital format by an A/D converter 3C before being supplied as a time division signal (R-Y/B-Y) to a signal processing circuit 5C.

The signal processing circuits 5Y and 5C carry out signal processing such as scanning line interpolation and time compression. As will be described later, the signal processing circuits 5Y and 5C output a double rate luminance signal and double rate color difference signals. These double rate signals are converted to analog format by D/A converters 6Y, 6R and 6B.

A clock generator 7, supplied with a horizontal synchronizing signal HD that is separated from the video signal, outputs a clock signal $CK_H$ locked in phase to the signal HD. The clock signal $CK_H$ from the clock generator 7 is sent to the digital processing section comprising the A/D converters 3Y and 3C as well as the D/A converters 6Y, 6R and 6B.

The double rate luminance signal and color difference signals from the D/A converters 6Y, 6R and 6B are supplied to a matrix circuit 8. In turn, the matrix circuit 8 outputs double rate red, green and blue signals R, G and B to a color television picture tube 10 via amplifiers 9R, 9G and 9B, respectively. The color television picture tube 10 provides a non-interlaced scanning display whose scanning line count is double the normal count.

A vertical synchronizing signal VD separated from the video signal is fed to a delay circuit 11. In turn, the delay circuit 11 supplies a downstream deflection section with a signal $VD_{OUT}$ delayed by 263H. This arrangement is provided so as to ensure internal synchronization while the signal processing circuits 5Y and 5C delay their signals by 263H each, as will be described later.

A normal video signal detection circuit 12, receiving the vertical synchronizing signal VD and the delayed vertical synchronizing signal from the delay circuit 11, determines the number of scanning lines per field in the video signal. The circuit 12 then supplies the signal processing circuits 5Y and 5C with a control signal $S_{KC}$ indicating whether the video signal is a normal signal or other than normal.

Figure 2:
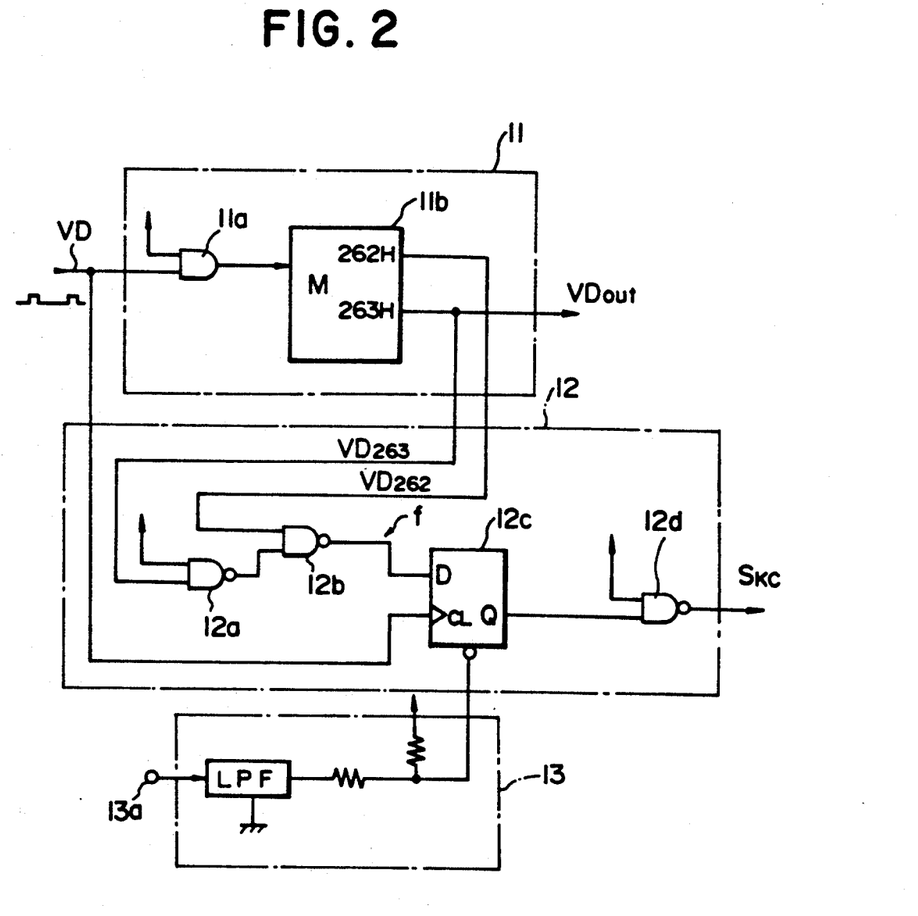
FIG. 2 is a view showing the construction of a normal video signal detection circuit in the embodiment.
Figure 3:
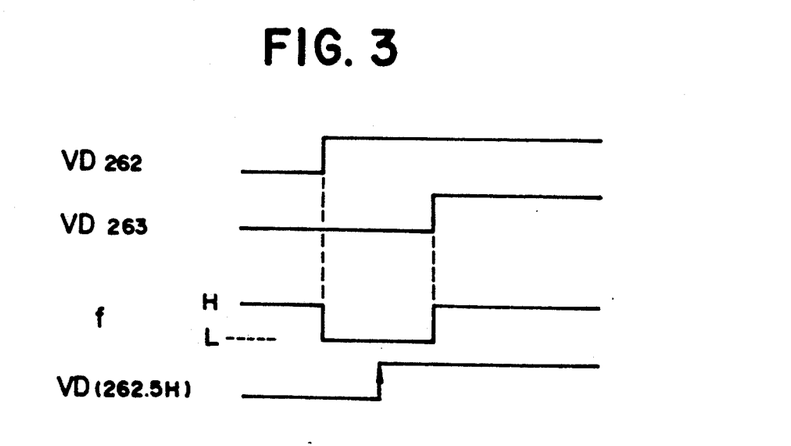
FIG. 3 is a view depicting how the normal video signal detection circuit of FIG. 2 works.

The delay circuit 11 and the normal video signal detection circuit 12 are illustratively constructed as shown in FIG. 2. In FIG. 2, the vertical synchronizing signal VD is input to a memory circuit 11b via an AND gate 11a. In turn, the memory circuit 11b outputs a delay signal $VD_{262}$ delayed by 262H and a delay signal $VD_{263}$ delayed by 263H. As mentioned above, the delay signal $VD_{263}$ delayed by 263H is sent as the signal $VD_{OUT}$ to the deflection section. The normal video signal detection circuit 12 is fed with the two delay signals $VD_{263}$ and $VD_{262}$ which are input respectively to NAND gates 12a and 12b. This generates a signal f whose waveform is depicted in FIG. 3. The signal f is fed to a D flip-flop circuit 12c where the signal is latched by application of the vertical synchronizing signal VD.

Where the video signal is a normal signal having a scanning line count of 262.5 lines per field (i.e., between 262 and 263 lines), the leading edge of the vertical synchronizing signal VD corresponds to the low level of the signal f. That is, having latched the signal f, the D flip-flop circuit 12c outputs a control signal $S_{KC}$ through a NAND gate 12d. The control signal $S_{KC}$ is brought Low if the video signal fed to the television receiver is a normal signal; the control signal $S_{KC}$ is brought High if the video signal is something other than normal, having a scanning line count per field outside the range of 262 to 263 lines. In the latter case, the signal f is latched at its high level. This causes the control signal $S_{KC}$ to be output at the high level.

An operation reset control section 13 comprises a control input terminal 13a. Bringing the terminal 13a Low stops the latching operation of the D flip-flop 12c, i.e., the operation for detecting whether the video signal is normal or not. With the latching operation stopped, the control signal $S_{KC}$ is always kept at the low level. As such, the operation reset control section 13 is used where it is desired to operate the signal processing circuits 5Y and 5C on the input video signals being always taken as normal signals regardless of their scanning line counts.

Figure 4:
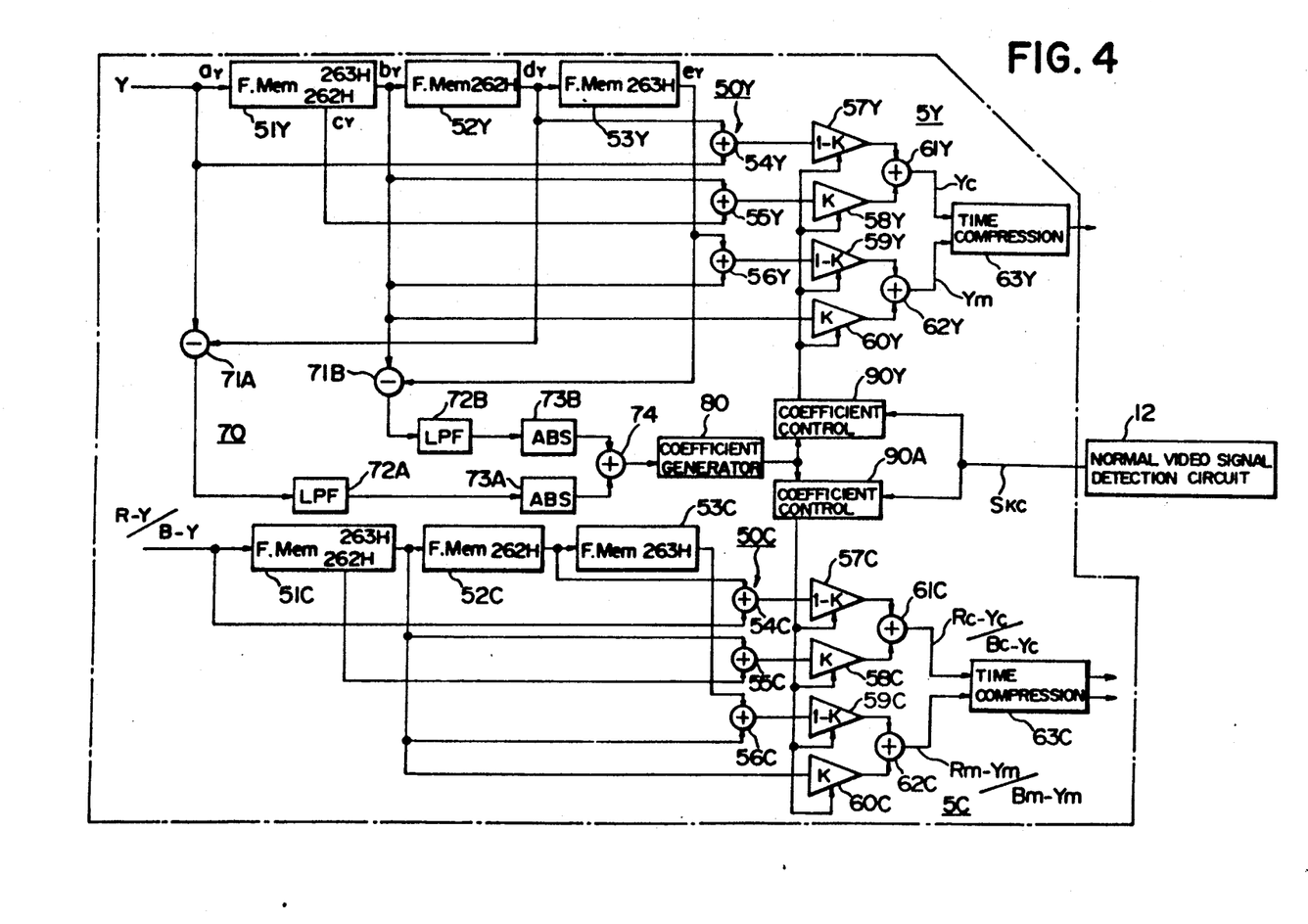
FIG. 4 is a circuit block diagram of signal processing circuits in the embodiment.

The signal processing circuits 5Y and 5C, fed with the control signal $S_{KC}$ from the normal video signal detection circuit 12, are constructed as shown in FIG. 4. In the signal processing circuit 5Y for luminance signal processing, the luminance signal Y is sent to a field memory 51Y constituting a delay line. By this time, the luminance signal Y has been converted to digital format by the A/D converter 3Y in FIG. 1. The field memory 51Y is made of what is known as a three-port field memory, comprising a first output terminal with a delay time of 263 H as well as a second output terminal with a delay time of 262 H. The signal coming out of the first output terminal of the field memory 51Y is supplied to a field memory 52Y also constituting the delay line. The field memory 52Y has a delay time of 262 H. The output signal from the field memory 52Y is fed to a field memory 53Y also constituting the delay line. The field memory 53Y has a delay time of 263 H.

The input signal to the field memory 51Y and the output signal from the field memory 52Y are sent to an adder 54Y where the signals are added and averaged. The output signal from the adder 54Y is multiplied by a multiplier 57Y by a factor of $(1-K \ (K \leq 1))$ before being sent to an adder 61Y. The output signals from the first and the second output terminals of the field memory 51Y are fed to an adder 55Y where the signals are added and averaged. The output signal from the adder 55Y is multiplied by a factor of K by a multiplier 58Y before being supplied to the adder 61Y.

In addition, the output signal from the first output terminal of the field memory 51Y and the output signal from the field memory 53Y are sent to an adder 56Y where the signals are added and averaged. The output signal from the adder 56Y is multiplied by a multiplier 59Y by a factor of $(1-K)$ before being sent to an adder 62Y. The output signal from the first output terminal of the field memory 51Y is multiplied by a factor of K by a multiplier 60Y before being fed to the adder 62Y.

The value of K for the multipliers 57Y through 60Y is controlled according to a motion detection signal and to the control signal $S_{KC}$ from the normal video signal detection circuit 12, as will be described later. That is, the value of K is varied depending on the degree of motion and on whether the video signal is a normal signal or not. For example, K=0 when the picture is still. The maximum value of K is 1. The field memories 51Y through 53Y, adders 54Y through 56Y, 61Y and 62Y, and multipliers 57Y through 60Y constitute a scanning line interpolation circuit 50Y.

Figure 5:
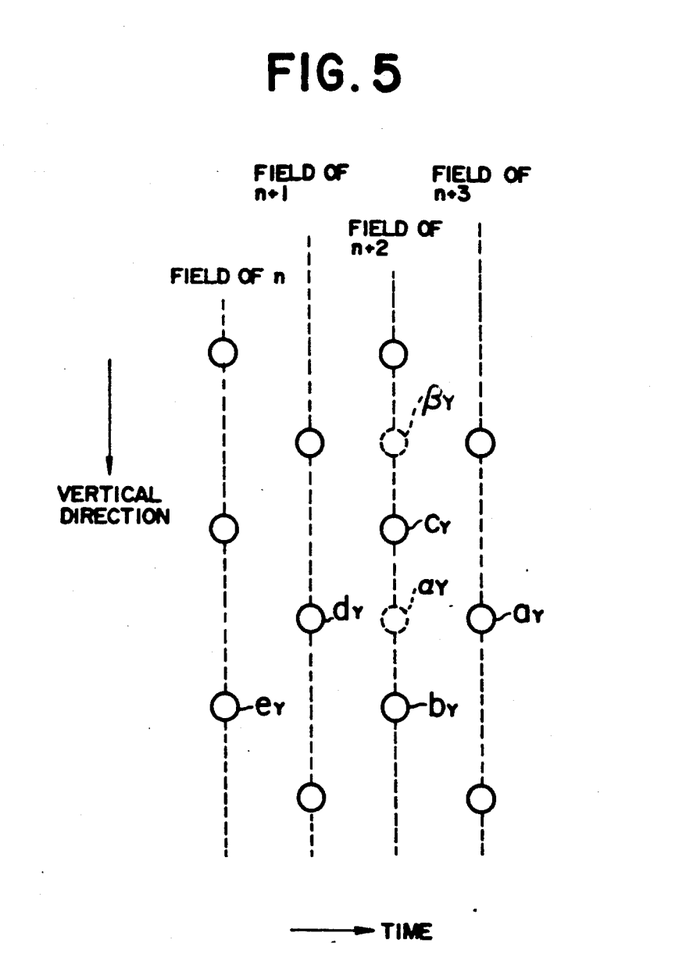
FIG. 5 is a view illustrating how scanning line interpolation is carried out by the embodiment.

FIG. 5 is a view describing how scanning line interpolation is carried out with this embodiment. Like FIG. 11, FIG. 5 depicts a time base versus vertical direction scanning line structure. Each circle in the figure stands for a scanning line of each field. The input signal to the field memory 51Y is represented by $a_y$, the output signal from the first output terminal thereof by $b_y$, and the output signal from the second output terminal thereof by $c_y$. The output signal from the field memory 52Y is indicated by $d_y$, and the output signal from the field memory 53Y by $e_y$. These signals $a_y$ through $e_y$ are located where depicted in FIG. 5.

In the scanning line interpolation circuit 50Y, the output signal $b_y$ from the first output terminal of the field memory 51Y turns into a main scanning line signal for the motion picture part. The output signal $(b_y+e_y)/2$ from the adder 56Y becomes a main scanning line signal for the still picture part. Thus the adder 62Y outputs a main scanning line signal Ym that adds up the main scanning line signals of the motion and still picture parts in a way reflecting the degree of the motion involved.

The output signal $(a_y+d_y)/2$ from the adder 54Y becomes an interpolated scanning line signal for the still picture part, while the output signal $(b_y+c_y)/2$ from the adder 55Y turns into an interpolated scanning line signal for the motion picture part. Thus the adder 61Y outputs an interpolated scanning line signal Yc that adds up the interpolated scanning line signals for the motion and still picture parts in a way reflecting the degree of the motion involved. In FIG. 5, the locations of the interpolated scanning lines in the (n+2)th field are indicated by broken line circles $\alpha_Y$ and $\beta_Y$.

The main scanning line signal Ym and the interpolated scanning line signal Yc from the scanning line interpolation circuit 50Y are sent to a time compression circuit 63Y. In turn, the time compression circuit 63Y time-compresses the main scanning line signal Ym and the interpolated scanning line signal Yc by half each for continuous output. That is, the time compression circuit 63Y outputs the double rate luminance signal.

In FIG. 4, the input signal to the field memory 51Y and the output signal from the field memory 52Y are fed to a subtracter 71A for subtraction. In turn, the subtracter 71A outputs a frame difference signal (i.e., 525 H difference signal). After a low-pass filter 72A has removed the noise and dot disturbance components from the high-pass domain of the frame difference signal, the signal is converted to absolute valve format by an absolute valve circuit 73. The resulting absolute value signal is fed to an adder 74.

The output signal from the first output terminal of the field memory 51Y and the output signal from the field memory 53Y are sent to a subtracter 71B for subtraction. In turn, the subtracter 71B outputs a frame difference signal. After a low-pass filter 72B has removed the noise and dot disturbance components from the high-pass domain of the frame difference signal, the signal is converted to absolute valve format by an absolute valve circuit 73B. The resulting absolute value signal is supplied to the adder 74.

The field memories 51Y through 53Y, subtracters 71A and 71B, low-pass filters 72A and 72B, absolute valve circuits 73A and 73B, and adder 74 constitute a motion detection circuit 70. The greater the degree of motion, the higher the output signal from the adder 74.

Figure 6:
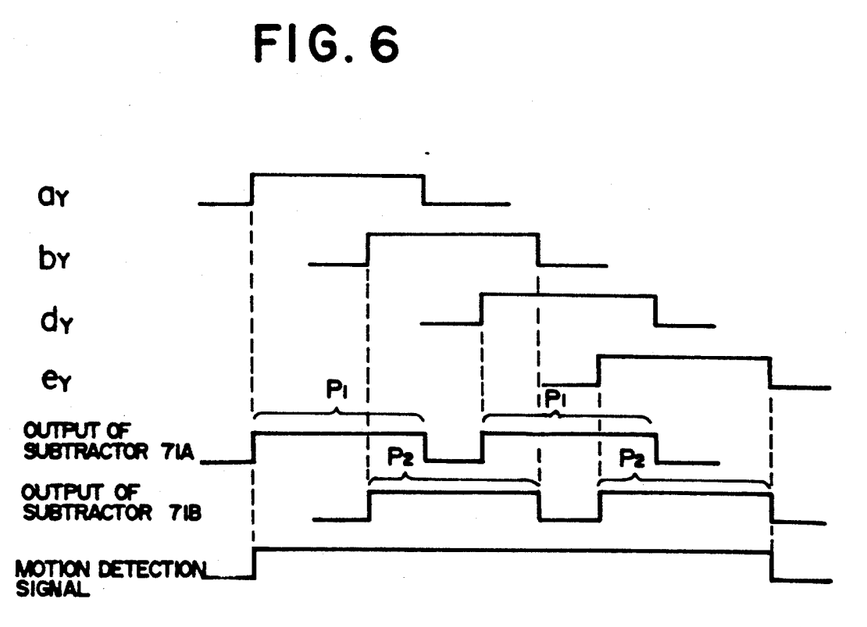
FIG. 6 is a view indicating how a motion detection circuit of the embodiment works.

How the motion detection circuit 70 works is described below with reference to FIG. 6. The input signal $a_y$ to the field memory 51Y and the output signals $b_y$, $d_y$ and $e_y$ from the field memories 51Y through 53B illustratively have waveforms shown in FIG. 6. In connection with these signals, the output signals from the subtracters 71A and 71B have waveforms also shown in FIG. 6. The output signals from the subtracters 71A and 71B allow a portion $P_1$ in FIG. 6 to be detected as an inter-frame motion; the output signal from the subtracter 71B allows a portion $P_2$ in the figure to be detected as an inter-frame motion. Thus the use of the output signals from the subtracters 71A and 71B permits acquisition of a motion detection signal between fields (1/60 sec.), as illustrated.

The motion detection signal from the adder 74 is sent to a coefficient generator 80. The value of K for the multipliers 57Y through 60Y is generated by the coefficient generator 80. The value of K varies between 0 and 1 depending on the magnitude of the motion detection signal.

How the signal processing circuit 5C for chrominance signal processing works will now be described. The signal processing circuit 5C comprises a scanning line interpolation circuit 50C and a time compression circuit 63C. Because the scanning line interpolation circuit 50C has the same structure as that of the scanning line interpolation circuit 50Y in the above-described signal processing circuit 5Y, like or corresponding parts are designated by like reference characters, except that the suffix Y is replaced by C. The value of K for the multipliers 57C through 60C in the scanning line interpolation circuit 5C is also generated by the coefficient generator 80.

A field memory 51C in the scanning line interpolation circuit 50C is supplied with a time division signal (R-Y/B-Y). This time division signal is derived from the red color difference signal R-Y and blue color difference signal B-Y, the latter two signals having being converted to digital format by the A/D converter 3C of FIG. 1. An adder 62C outputs a main scanning line signal (Rm-Ym/Bm-Ym), while an adder 61C outputs an interpolated scanning line signal (Rc-Yc/Bc-Yc).

Output by the scanning line interpolation circuit 50C, the main scanning line signal (Rm-Ym/Bm-Ym) and interpolated scanning line signal (Rc-Yc/Bc-Yc) go to the time compression circuit 63C. In turn, the time compression circuit 63C time-compresses the main scanning line signal (Rm-Ym/Bm-Ym) and interpolated scanning line signal (Rc-Yc/Bc-Yc) by half each for continuous output. In this case, the time compression circuit 63C outputs the red color difference signal and the blue color difference signal separately. Ultimately, the time compression circuit 63C outputs double rate color difference signals.

Coefficient control circuits 90Y and 90C control the value of K according to the control signal $S_{KC}$ from the normal video signal detection circuit 12. By this time, the value of K has been generated by the coefficient generator 80 and supplied to the multipliers 57Y through 60Y in the scanning line interpolation circuit 50Y as well as to the multipliers 57C through 60C in the scanning line interpolation circuit 50C. Operating as they do, the coefficient control circuits 90Y and 90C serve as means for controlling the interpolation scheme provided by the scanning line interpolation circuits 50Y and 50C.

Below is a description of how the scanning line interpolation process is controlled on the basis of the value of K generated in response to motion detection in the above-described signal processing circuit configuration. If the motion detection circuit 70 detects a motion picture signal and accordingly generates a signal indicative thereof, the coefficient generator 80 generates a "1" as the coefficient K. In turn, the multiplier 58Y outputs the signal $(b_y+c_y)/2$ that becomes the interpolated scanning line signal Yc; the multiplier 60Y outputs the signal $b_y$ that becomes the main scanning line signal Ym.

If the motion detection circuit 70 detects a still picture signal and accordingly generates a signal indicative thereof, the coefficient generator 80 generates a "0" as the coefficient K. In turn, the multiplier 57Y generates the signal $(a_y+d_y)/2$ that becomes the interpolated scanning line signal Yc; the multiplier 59Y outputs the signal $(b_y+e_y)/2$ that becomes the main scanning line signal Ym. If the motion detection circuit 70 detects a signal representing something between still and motion picture and accordingly generates a signal indicative thereof, the coefficient generator 80 outputs gradually varied values of K. That is, the interpolated scanning line signal Yc is generated by the multipliers 57Y and 58Y and adder 61Y mixing the signals $a_y$, $b_y$, $c_y$ and $d_y$ appropriately. The main scanning line signal Ym is generated by the multipliers 59Y and 60Y and adder 62Y mixing the signals $b_y$ and $(b_y+e_y)$ in a suitable manner.

The time compression each of circuit 63Y time-compresses the interpolated scanning line signal Yc and main scanning line Ym by half. Specifically, an interpolated scanning line signal Yc and a main scanning line signal Ym are inserted into the space of a single scanning line so that the scanning line count per field will be doubled from 262.5 to 525. Thus if the signal is a motion picture signal, the interpolated scanning line $\alpha y$ in FIG. 5 is generated using only the data $(b_y, c_y)$ within the current $(n+2)$th field. On the other hand, if the signal turns out to be a still picture signal or one representing something between still and motion picture, the interpolated scanning line $\alpha y$ is generated using only the data $(a_y, d_y)$ outside the $(n+2)$th field or by combining these data with the data $(b_y, c_y)$ inside the $(n+2)$th field. The scanning line $b_y$ is generated using both the data $(a_y, d_y)$ inside the $(n+2)$th field and the data $(e_y)$ outside thereof. The inside-field processing and the out-of-field processing are switched depending on the video signal being a motion picture signal on the one hand, or a still picture signal or one representing something between still and motion picture on the other. This switching of processing modes for scanning line interpolation is called adaptive processing. The same scanning line interpolation method applies unchanged to the scanning line interpolation circuit 50C for chrominance signal processing.

In this manner, the scanning line interpolation circuits 50Y and 50C carry out scanning line interpolation through adaptive processing. However, if the video signal supplied to the television receiver is not a normal signal, i.e., if the signal has a scanning line count outside the range of 262 to 263 lines, the above-described adaptive processing is not appropriate. Where out-of-field data are used for interpolation regarding a signal with a non-standard scanning line count, the picture dislodges vertically when displayed.

In this embodiment, the normal video signal detection circuit 12 supplies the coefficient control circuits 90Y and 90C with the control signal $S_{KC}$ indicating whether the video signal is a normal signal or not. When the control signal $S_{KC}$ shows the video signal to be a non-standard signal, the coefficient control circuits 90Y and 90C forcibly set the coefficient K to 1 regardless of the value of K generated by the coefficient generator 80. The coefficient K, now set to 1, is fed to the multipliers 57Y through 60Y and 57C through 60C. That is, when the television receiver according to the invention is supplied with a non-standard video signal, the scanning line interpolation circuits 50Y and 50C perform scanning line interpolation through inside-field processing, i.e., using only the data inside the current field ($b_y$, $c_y$ in FIG. 5). This is done regardless of the supplied signal being a still picture or motion picture signal. In this manner, the adaptive processing is not resorted to for scanning line interpolation.

Thus when supplied with a non-standard video signal, the embodiment of the invention prevents the picture from getting vertically dislodged on display as a result of the dislocation of interpolated scanning lines from the adaptive processing in which out-of-field data are used for interpolation. For example, when a video disc player is brought to a stop and characters are displayed in the stopped state, these characters are displayed normally, as opposed to the dislodged display conventionally experienced as illustrated in FIG. 12 (B).

Figure 7:
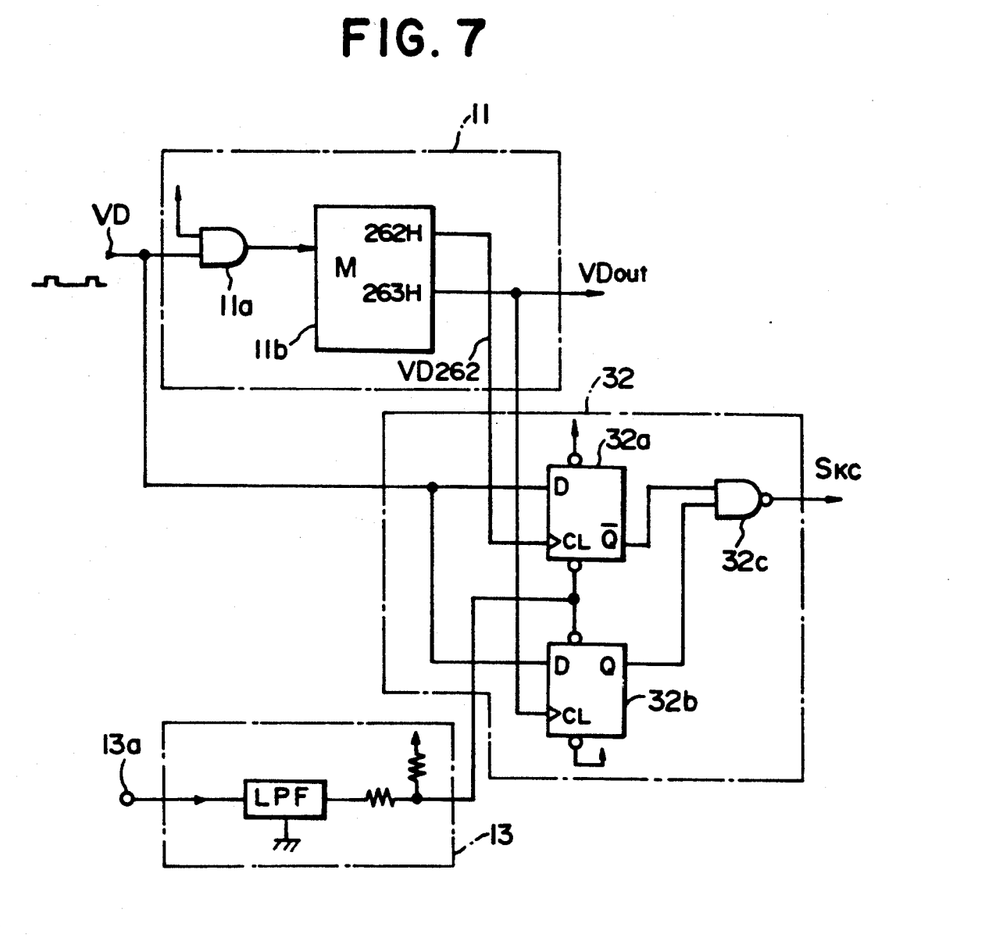
FIG. 7 is a view depicting the construction of an alternative normal video signal detection circuit for the embodiment.

The normal video signal detection circuit 12, the means for normal video signal detection of the invention, may be alternatively constructed as a circuit 32 in FIG. 7. How this alternative normal video signal detection circuit 32 works will now be described with reference to FIG. 8.

Figure 8:
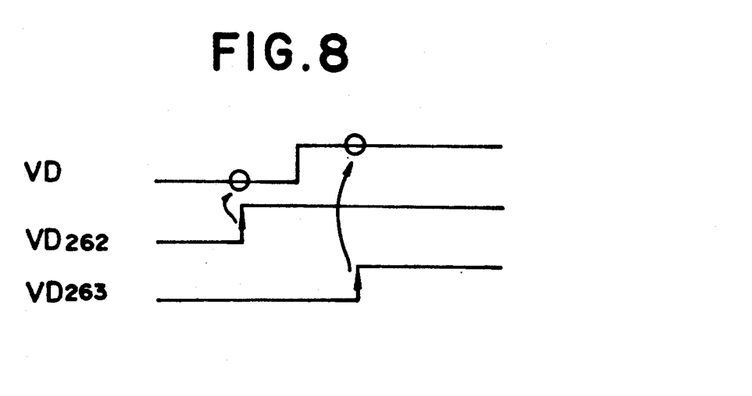
FIG. 8 is a view showing how the normal video signal detection circuit of FIG. 7 works.

In FIG. 7, the vertical synchronizing signal VD is input to D flip-flop circuits 32a and 32b. The circuits 32a and 32b latch the signal VD at leading edges of delay signals $VD_{263}$ and $VD_{262}$ that are output by the delay circuit 11. As shown in FIG. 8, if the video signal is a normal signal having a scanning line count of 252.5 per field, the inverted latch output from the D flip-flop circuit 32a and the latch output from the D flip-flop circuit 32b coincide with each other at the high level, while the output from a NAND gate 32c is brought Low. If the video signal is a non-standard signal, the NAND gate 32c is brought High. That is, the control signal $S_{KC}$ that distinguishes the normal signal from other signals is generated.

Figure 9:
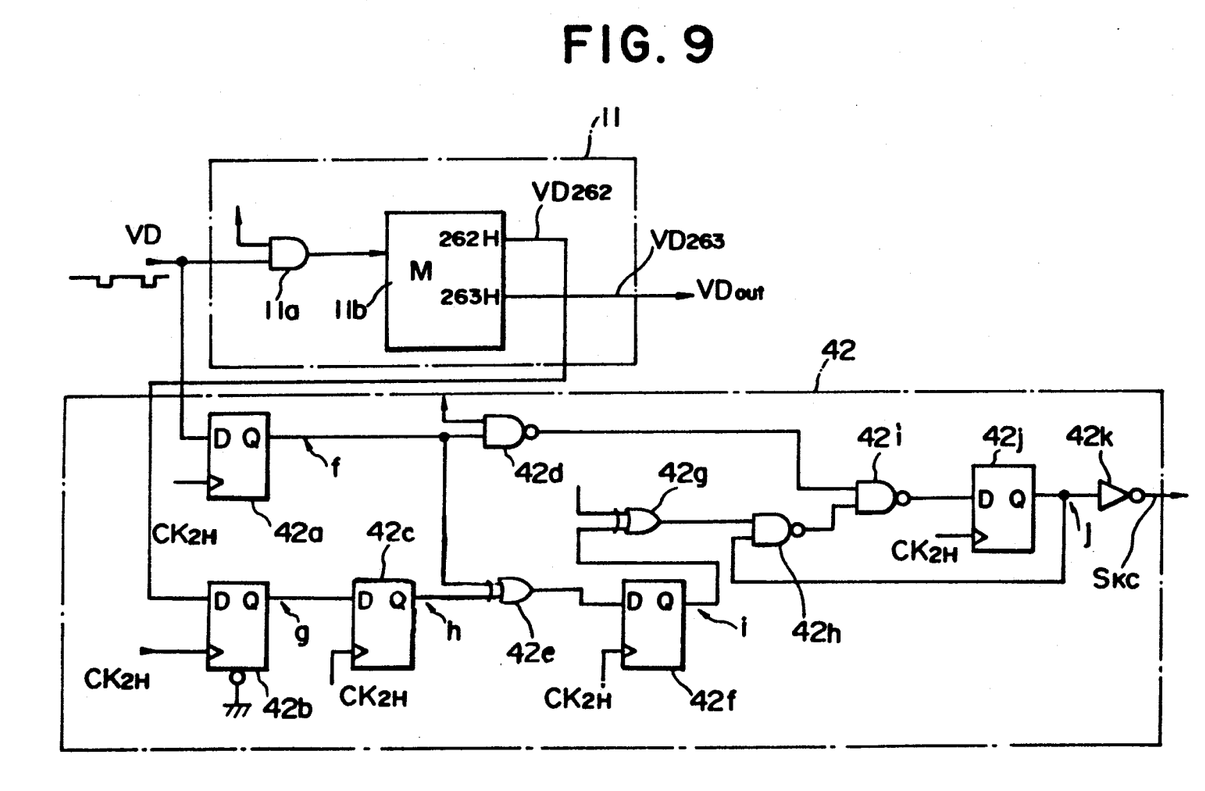
FIG. 9 is a view illustrating the construction of another alternative normal video signal detection circuit for the embodiment.
Figure 10A:
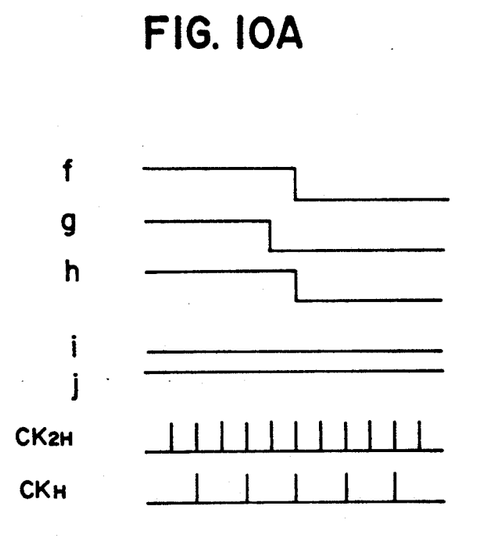
FIGS. 10A and 10B are views indicating how the normal video signal detection circuit of FIG. 9 works.
Figure 10B:
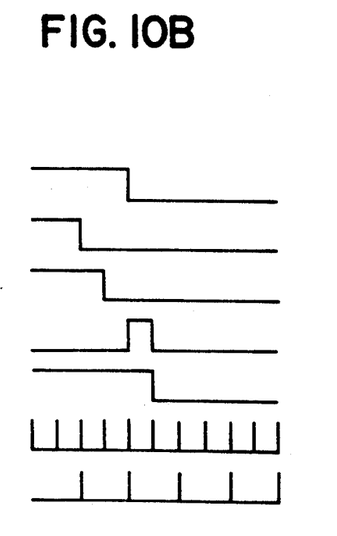

The standard video signal detection means may also be constructed as a standard video signal detection circuit 42 illustrated in FIG. 9. How this alternative standard video signal detection circuit 42 works will now be described with reference to FIGS. 10 (A) and 10 (B). The standard video signal detection circuit 42 comprises D flip-flop circuits 42a, 42b, 42c, 42f and 42j; NAND gates 42d, 42h and 42i; exclusive-OR gates 42e and 42g; and an inverter 42k. The D flip-flop circuits 42a, 42b, 42c, 42f and 42j are each supplied with a clock signal $CK_{2H}$ locked to double the horizontal synchronizing signal period.

FIG. 10 (A) illustrates waveforms at points f, g, h, i and j that are in effect when a normal signal having a scanning line count of 262.5 per field is supplied. Because the D flip-flop circuit 42a receives a 262H delayed component $VD_{262}$ and the D flip-flop circuit 42b accepts the vertical synchronizing signal VD, the signal waveform at point g has a phase difference of 0.5H relative to the signal waveform at point f. The two waveforms coincide in phase at point h via the D flip-flop circuit 42c. Thus the output from the exclusive-OR gate 42e is at the low level. When the signal waveform at point i is at the low level, the waveform at point j remains unchanged. When the signal waveform at point f is at the high level, the waveform at point j is at the high level. For this reason, the signal waveform at point j in effect is at the high level when a normal signal is supplied. That is, the control signal $S_{KC}$ is at the low level.

FIG. 10 (B) illustrates the waveforms at points f, g, h, i and j in effect when a non-standard signal with a scanning line count of 263 per field is supplied. In this case, there develops a phase difference of 1H between points f and g, as well as a phase difference of 0.5H between points f and h. The output from the exclusive-OR gate 42e and flip-flop circuit 42f, i.e., the signal waveform at point i, goes High for a period of 0.5H only. When point i is at the high level, point j is at the low level. That is, the control signal $S_{KC}$ is at the high level when a non-standard signal is supplied. In this manner, the normal video signal detection circuit 42 generates the control signal $S_{KC}$ that indicates whether the supplied video signal is a normal video signal having a scanning line count of 262.5 per field, or some other non-standard signal.

It will be appreciated that the logical constructions of the normal video signal detection circuit and of the control signal $S_{KC}$ are not limited to those illustratively shown in FIGS. 2, 7 and 9. Other variations and modifications may also be constructed.

As described, the television receiver according to the invention uses the normal video signal detection means to determine whether the supplied video signal is a normal signal or not. If the video signal turns out to be a non-standard signal, the interpolation control means of the television receiver forces the scanning line interpolation means thereof to use only the data in the current field for scanning line interpolation. This scheme prevents the supplied non-standard video signal from being vertically dislodged when displayed on the screen. Thus the television receiver always provides a normal picture display.

As many apparently different embodiments of this invention may be made without departing from the spirit and scope thereof, it is to be understood that the invention is not limited to the specific embodiments thereof except as defined in the appended claims.

What is claimed is:

1. A television receiver for extended definition television comprising:
    a luminance video signal processing circuit for controllably processing a separated luminance component of an extended definition television signal and comprising field memory means for delaying the separated luminance components, a motion detection circuit connected to outputs of said field memory means for detecting frame-to-frame motion in the separated luminance component, a scanning line interpolation circuit connected to said field memory means and having controllable interpolation coefficients controlled in response to outputs from said motion detecting circuit, and a time compression circuit connected to outputs of said scanning line interpolation circuit;
    a chrominance video signal processing circuit for controllably processing a separated chrominance component of the extended definition television signal; and
    a normal video signal detection circuit for detecting a number of scanning lines in a field of the extended definition television signal and controlling the processing of said luminance video signal processing circuit and said chrominance video signal processing circuit in response to a detected number of scanning lines.

2. A television receiver for extended definition television comprising:
    a luminance video signal processing circuit for controllably processing a separated luminance component of an extended definition television signal;
    a chrominance video signal processing circuit for controllably processing a separated chrominance component of the extended definition television signal and comprising a field memory for delaying the separated chrominance component, adder means connected to outputs of said field memory for producing a main scanning line signal and an interpolated scanning line signal, and a time compression circuit for compressing the main scanning line signal and the interpolated scanning line signal; and
    a normal video signal detection circuit for detecting a number of scanning lines in a field of the extended definition television signal and controlling the processing of said luminance video signal processing circuit and said chrominance video signal processing circuit in response to a detected number of scanning lines.

3. A television receiver for extended definition television as claimed in claim 1, wherein said normal video signal detection circuit detects the number of scanning lines of each field of a video signal and generates a determination signal determining whether said video signal is a normal video signal or not.

4. A television receiver for extended definition television as claimed in claim 1, wherein said motion detection circuit comprises:
    a filter connected to outputs of said field memory means;
    an absolute value circuit connected to an output of said filter;
    a coefficient generator connected to an output of said absolute value circuit; and
    a coefficient controller connected to said coefficient generator for producing a coefficient control signal fed to said scanning line interpolation circuit.

5. A television receiver for extended definition television as claimed in claim 4, wherein said coefficient controller receiving a signal from said normal video signal detection circuit controls said scanning line interpolation circuit for interpolation using only data in a current field of the extended definition television signal, when said normal video signal detection circuit generates a detection signal indicating the detection of a signal other than the normal video signal.

6. A television receiver for extended definition television as claimed in claim 1, wherein said field memory means comprises a first memory, a second memory and a third memory, all said memories being connected in series and outputs thereof being fed to said motion detection circuit and to said scanning line interpolation circuit.

* * * * *